United States Patent [19]

Ermolovich et al.

[11] 4,128,869

[45] Dec. 5, 1978

[54] PHASE CONTROL ARRANGEMENT OF VALVE CONVERTER

[76] Inventors: Eduard S. Ermolovich, poselok Krasnaya Gorka, ulitsa Zavodskaya, 2, kv. 4, Istra Moskovskoi oblasti; Mikhail V. Olshvang, Galyanovo, korpus 13a, kv. 63, Moscow, both of U.S.S.R.

[21] Appl. No.: 758,689

[22] Filed: Jan. 12, 1977

[51] Int. Cl.² .......................................... H02M 7/155
[52] U.S. Cl. .................................................. 363/87
[58] Field of Search ...................... 363/51, 81, 87, 129

[56] References Cited

U.S. PATENT DOCUMENTS

| | | | |
|---|---|---|---|
| 3,683,262 | 8/1972 | Neusser et al. | 363/87 X |
| 3,821,629 | 6/1974 | Liss | 363/51 |
| 3,883,791 | 5/1975 | Zeuna et al. | 363/87 |
| 4,028,607 | 6/1977 | Watanabe | 363/51 |

*Primary Examiner*—William M. Shoop
*Attorney, Agent, or Firm*—Lackenbach, Lilling & Siegel

[57] ABSTRACT

The phase control arrangement of a valve converter according to the invention comprises a control signal former having one input connected to the valve converter and another input connected to a reference signal unit. The output pulse from the control signal former is fed, concurrently with the output signal of a sawtooth oscillator, to a zero element having its output connected, via a phase limiter, to the input of the control pulse generator. Control pulses are distributed among the converter valves by means of a pulse distributor. The sawtooth oscillator has two inputs of which one is connected to the input of the pulse distributor and the other is connected to the output of the control signal former. The arrangement provides for correspondence of performance parameters of the converter to the preset values and maximum response speed in transient conditions.

4 Claims, 15 Drawing Figures

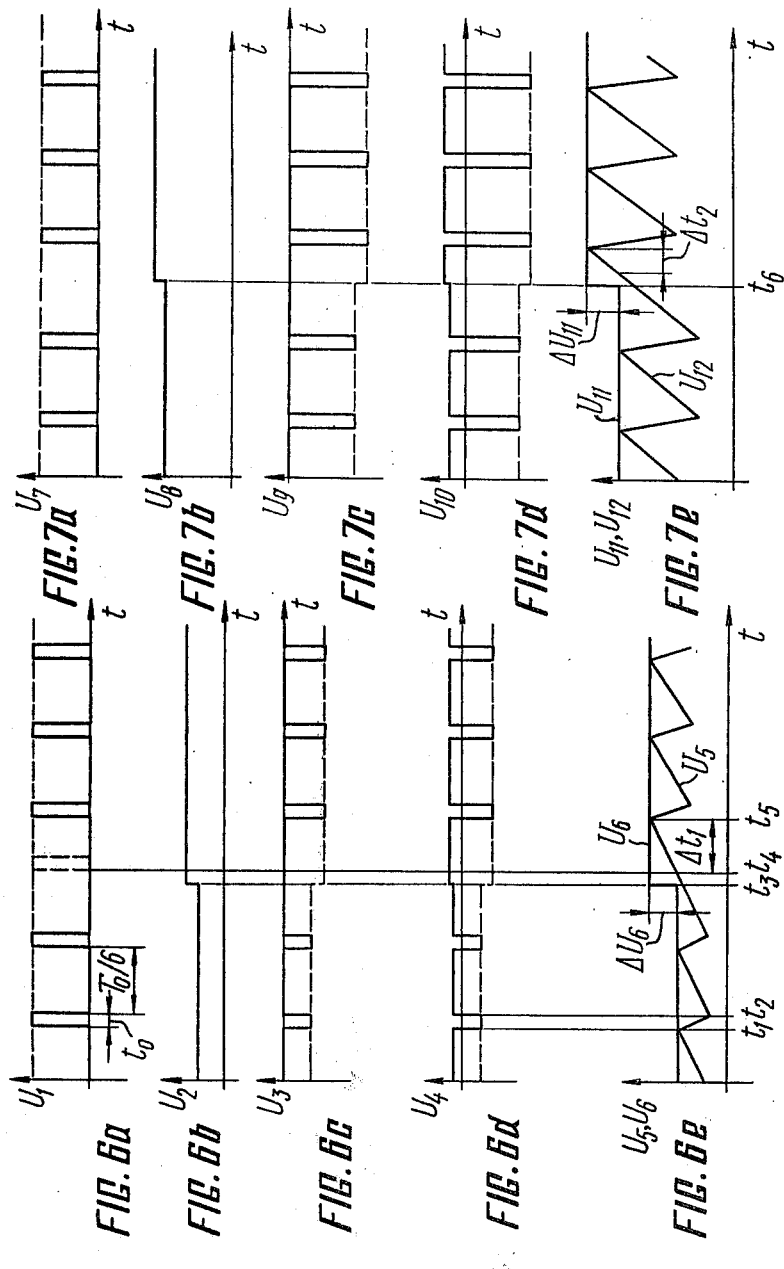

PHASE CONTROL ARRANGEMENT OF VALVE CONVERTER

FIELD OF THE INVENTION

The present invention relates to valve converters to be used in automatically controlled systems and, more specifically, to a phase control arrangement of valve converter.

The phase control arrangement of a valve converter may be used mainly in automatic control systems of valve converters for d-c. power transmission lines where stringent requirements are imposed on response speed and accuracy of control. In other words, the arrangement is to be used in systems which provide for symmetry of control pulses, that is equality of intervals between control pulses with high accuracy, exact correspondence of the converter performance to pre-set values and maximum response speed in transient conditions.

DESCRIPTION OF THE PRIOR ART

In known single-channel valve converter control arrangements, control pulses are generated in a single pulse generator common for the entire arrangement, independent of the number of valves, and are then distributed among the valves of the converter in accordance with the ring sequence. This provides for maximum symmetry of pulses and simplifies adjustment of the arrangement. Efficiency of operation of arrangements for automatic control of valve converters is characterized by the conversion ratio, that is by the ratio of the shift of ignition angle to the deviation of control pulse fed to the input of the control arrangement.

The greater the conversion ratio, the more efficient the valve converter control arrangement.

Single-channel valve converter control arrangements have constant conversion ratio which do not depend on the conversion performance.

The value of the conversion ratio is limited by stability conditions. Exceeding the admissible value of the conversion ratio in an automatically controlled system may result in self-excited oscillation. Therefore, the value of the conversion ratio is normally set-up on the basis of the admissible limit determined by the stability conditions of the most unfavorable performance, that is this value is the lowest one among possible values within a pre-set range of the performance parameters of controlled converter (current, ignition angle and the like). It should be noted that for all other conditions of the control arrangement too wide a margin of the conversion ratio is provided, thus resulting in lower response speed and accuracy of control under these conditions.

A known phase control arrangement of the valve converter comprises a control pulse former having one input connected to the valve converter and another input connected to a reference signal unit; and a sawtooth oscillator producing an output signal which is fed, together with the output pulse of the control signal former, to a zero element having an output connected, via a phase limiter, to an input of a control pulse generator having an output connected to the input of a pulse distributor distributing pulses among valves of the valve converter and to the input of the sawtooth oscillator.

The arrangement functions in the following manner. The zero element is actuated at the moment corresponding to equality of the increasing portion of the sawtooth signal and the control signal produced by the control signal former which represents the difference between the controlled value and the pre-set the value of a certain parameter of valve converter performance. The parameter of performance may be represented by current, voltage, output and the like.

At the moments of actuation of the zero element, the control pulse generator produces control pulses. These pulses are fed, firstly, to the sawtooth oscillator for forming steep fronts of the sawtooth signal and, secondly, to the pulse distributor, wherefrom the pulses are fed, in accordance with the ring sequence, to valves of the valve converter.

Under steady operating conditions of the valve converter, the pre-set and controlled performance values are constant, hence the control signal remains unchanged. Steepness and amplitude of the sawtooth signal are selected in such a manner that under these conditions control pulses are fed every 1/6 of the main voltage period on the a-c. side in case of a six-valve bridge converter.

Under transient conditions, the control signal is changed, and depending on that change the time moments at which the control signal is compared to the increasing portion of the sawtooth signal are shifted, that is the control signals formed at the moments corresponding to the equality of sawtooth signal and control pulse are shifted a certain amount.

The conversion ratio of such an arrangement depends on the steepness of the increasing portions of the sawtooth signal. The linear nature, constant steepness and unchanged amplitude of the fronts of sawtooth signal determine the constant value of the conversion ratio for any operating conditions of the converter.

The disadvantage of the above-described phase control arrangement of the valve converter consists in that as the conversion ratio is selected to be the lowest one among those possible within a pre-set range of changes in performance parameters of the control converter (current, ignition angle $\alpha$ and the like) on the basis of stability conditions, the control arrangement features lower conversion ratios for all remaining operating conditions thus resulting in impaired response speed and accuracy under such conditions.

SUMMARY OF THE INVENTION

It is an object of the invention to provide a phase control arrangement of a valve converter having a variable conversion ratio thus enabling the selection of optimum control stability conditions, response speed and accuracy for any ignition angle $\alpha$ of the valve converter.

Another object of the invention is to provide a functional converter for forming an auxiliary (correcting) signal depending on the main control signal in accordance with the principle providing for maximum gain in a closed loop for any values of the control signal hence, for any ignition angle depending thereon.

With these and other objects in view, the invention consists of a phase control arrangement of a valve converter comprising a control signal former having one input connected to the valve converter and another input connected to a reference signal unit and a sawtooth oscillator producing an output signal which is fed, together with the output signal of the control signal former, to a zero element. The zero element has an output connected, via a phase limiter, to an input of a control pulse generator. An output of the control pulse generator is connected to an input of a pulse distributor distributing pulses among the valves of the valve converter and to an input of the sawtooth oscillator. According to the invention, the sawtooth oscillator has a second input which is electrically coupled to the output of the control signal former and designed for transmitting a signal modifying the amplitude of the sawtooth signal.

The sawtooth oscillator preferably comprises an integrator having a first input which is connected to the first input of the sawtooth oscillator, and a second input coupled to the first input of the sawtoothed oscillator via a series circuit including an inverter and an electronic switch. The switch has a control input connected to the output of the control pulse generator.

In order to convert the signal modifying the amplitude of the sawtooth signal, in accordance with principles non-linear, the electric coupling of the output of the control signal former to the first input of the sawtooth oscillator comprises a functional converter.

This construction of the phase control arrangement of the valve converter provides for modification of the steepness of increase and the amplitude of the sawtooth signal thus enabling variation of the conversion ratio of the arrangement. When such an arrangement is inserted in a closed loop of an automatic control system, the closed loop gain may be varied thus providing the possibility of selecting optimum stability conditions for control, response speed and accuracy at any ignition angle of the valve converter.

The use of the phase control arrangement of the valve converter in a d-c. power transmission line provides for more rapid elimination of emergency situations thus enabling the lowering of overloads on the equipment of converter sub-stations and the reduction of cost of this equipment due to lower overload margins, while restitution of normal conditions in the power transmission system is accelerated.

The increased accuracy of the arrangement also provides for employment of lighter substation equipment due to the more accurate evaluation of the maximum load.

BRIEF DESCRIPTION OF THE DRAWINGS

The invention will now be described with reference to specific embodiments thereof illustrated in the accompanying drawings, in which:

FIGS. 6a, b, c, d, e are graphs showing the formation of a sawtooth signal of variable amplitude at $\alpha < 15°$; and FIGS. 7a, b, c, d, e are graphs showing the formation of a sawtooth signal of variable amplitude at $\alpha > 40°$.

DETAILED DESCRIPTION OF THE INVENTION

Figure 1:
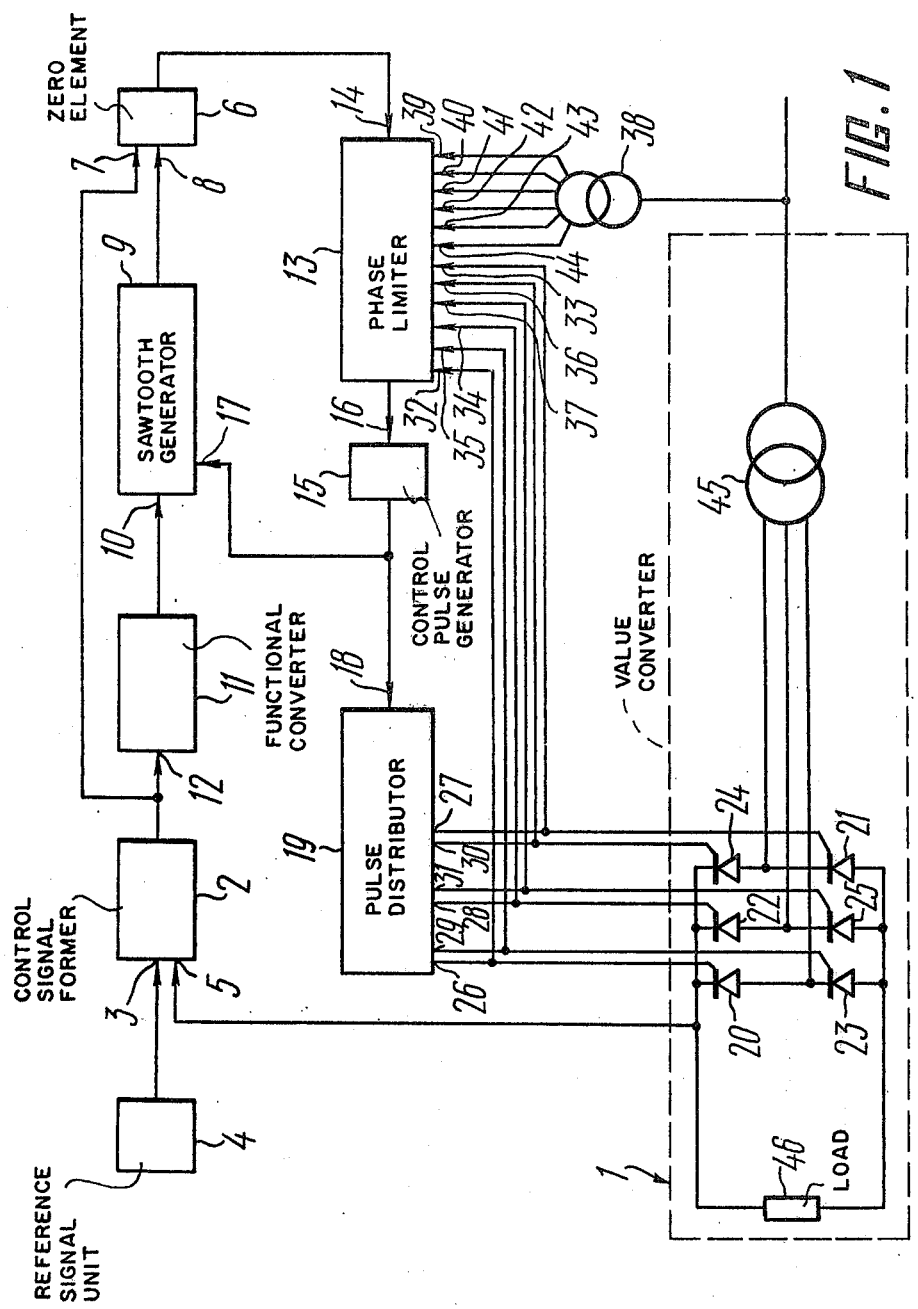
FIG. 1 is a block diagram of a valve converter showing the phase control arrangement of the valve converter according to the invention.

The phase control arrangement of a valve converter 1 (FIG. 1) comprises a control signal former 2 having an input 3 connected to a reference signal unit 4 and another input 5 electrically coupled to the valve converter 1.

The phase control arrangement of the valve converter 1 also comprises a zero element 6, of a conventional type, having one input 7 electrically coupled to the control signal former 2 and another input 8 connected to a sawtooth oscillator 9.

An input 10 of the sawtoothed oscillator 9 is connected to a functional converter 11 having an input 12 connected to the control signal former 2.

The arrangement has a phase limiter 13 having an input 14 connected to the zero element 6 and a control pulse generator 15, built of a monostable multivibrator circuit, having an input 16 connected to the phase limiter 13.

A pulse from the control pulse generator 15 is fed to an input 17 of the sawtooth oscillator 9 and to an input 18 of a pulse distributor for distributing pulses among the valves 20, 21, 22, 23, 24 and, 25 of the valve converter 1.

The pulse distributor 19 has six outputs 26, 27, 28, 29, 30, 31 electrically coupled to inputs 32, 33, 34, 35, 36 and 37, respectively of the phase limiter 13 and to the valves 20, 21, 22, 23, 24 and 25, respectively, of the valve converter 1.

The phase limiter 13 is connected to a voltage transformer 38 which has a three-phase primary winding connected to the a-c. side of the converter 1 and a six-phase secondary winding having each phase connected to a respective input 39, 40, 41, 42, 43 and 44 of the phase limiter 13.

The valve converter 1 comprises six controlled rectifiers 20, 21, 22, 23, 24, 25 connected into a three-phase bridge circuit configuration with supply on the a-c. side via a transformer 45, the bridge circuit being connected across a load 46 on the d-c. side. The load may comprise an electric motor, a power transmission line or the like.

Figure 2:
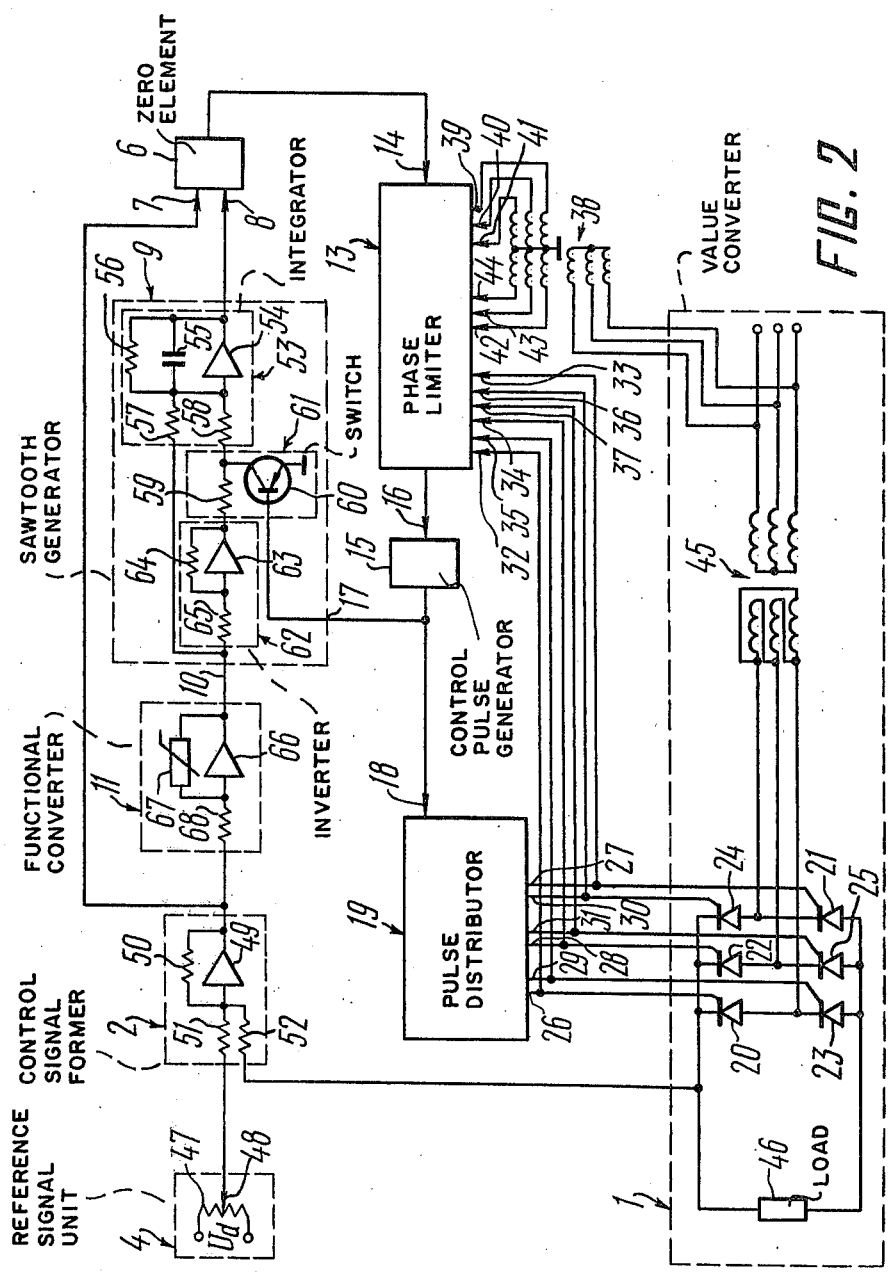
FIG. 2 is a schematic and block diagram of the phase control arrangement of the valve converter according to the invention illustrating the circuitry of some of the components.

FIG. 2 is an electrical schematic diagram of the phase control arrangement of the valve converter 1 in which the reference signal unit 4 comprises a potentiometer 47 supplied with stabilized voltage $U_d$. The reference signal is obtained on a slide 48 of the potentiometer 47.

The control signal former 2 comprises an operational amplifier 49 having a feedback resistor 50 and two input resistors 51 and 52. The input resistor 51 is connected to the potentiometer 47.

The sawtooth oscillator 9 comprises an integrator 53 of an operational amplifier 54 having a capacitor 55, a resistor 56 in the feedback circuit of the integrator 53, an input resistor 57 connected to the functional converter 11, and an input resistor 58 connected to a resistor 59 and to the collector of a transistor 60. The resistor 59 and transistor 60 form an electronic switch 61.

The lead of the resistor 59 which is the signal input of the electronic switch 61 is connected to an inverter 62 built of an operational amplifier 63 having a feedback resistor 64 and an input resistor 65 which is connected to the functional converter 11.

The base of the transistor 60, which is the control input of the electronic switch 61, is connected to the control pulse generator 15.

The functional converter 11 comprises an operational amplifier 66 having a non-linear member 67 in the feedback circuit and an input resistor 68 connected to the control signal former 2.

The non-linear member 67 (see FIG. 3) in the feedback circuit of the functional converter 11 comprises three parallel branches, first one comprising a Zener diode 69, another comprising a resistor 70 and the third comprising a series circuit including a diode 71 and a Zener diode 72 having a junction connected, via a resistor 73, to a source of bias voltage — $U_s$. The Zener knee of the Zener diode 69 is selected to be higher than the Zener knee of the Zener diode 72.

Figure 4:
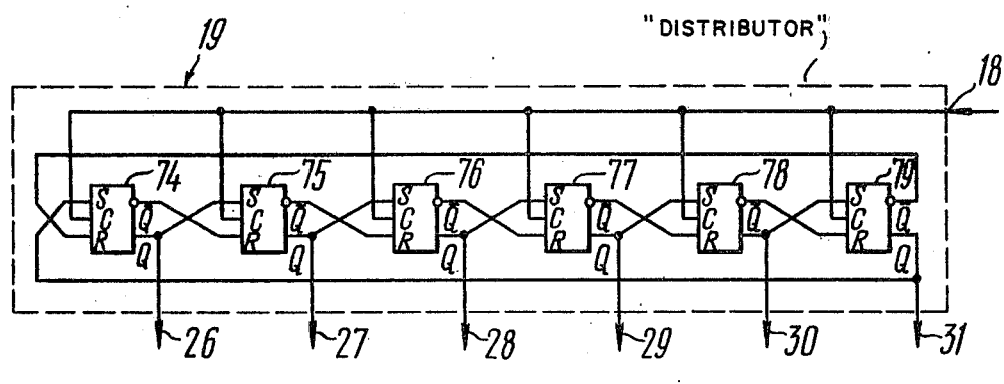
FIG. 4 is an electrical schematic diagram of the pulse distributor distributing pulses among the valves of the valve converter, according to the invention.

The pulse distributor 19 for distributing pulses among the valves of the valve converter 1 comprises six trigger circuits 74, 75, 76, 77, 78 and 79 (FIG. 4), each with provision for separate setting and resetting and featuring an input C allowing set and resetting. The circuits are connected to form a ring system so that the direct output Q and inverse output $\overline{Q}$ of each trigger circuit are connected to the set input S and the reset input R, respectively, of the next trigger circuit. A pulse from the control pulse generator 15 is fed to the allowing input C of all six trigger circuits.

The phase limiter 13 has six channels 80, 81, 82, 83, 84 and 85 (FIG. 5) limiting the phases of the pulses, the number of channels being equal to the number of valves in the valve converter 1. All six channels have identical circuit configuration and for clarity only the circuit of the channel 80 is illustrated and described. The channel has an AND gate 86 having inputs 87, 88 and 89 and an output which is connected to the channel's output. The input 87 is connected to a zero element 90 of a conventional type. The input 89 is connected to the input 37 of the phase limiter 13 and the input 88 is connected to the output of an OR gate 91 having inputs 92 and 93. The input 92 is connected, via a conventional delay member 94 and a differentiating circuit 95, including a series connected capacitor 96 and a shunting resistor 97, to the zero element 90.

The phase limiter 13 also comprises an OR gate 98 having six inputs 99, 100, 101, 102, 103 and 104 connected to the outputs of each of the channels 80, 81, 82, 83, 84, 85, respectively.

For better understanding of the manner of operation of the phase control arrangement of the valve converter, according to the invention, FIG. 6 shows graphical representations of the formation of a variable amplitude sawtooth signal at the output of the generator 9 at $\alpha < 15°$.

FIG. 6a shows the waveform of the voltage $U_1$ at the output of the control pulse generator;

FIG. 6b shows the waveform of the voltage $U_2$ at the first input of the generator 9 which modifies the amplitude of the sawtooth voltage;

FIG. 6c shows the waveform of the voltage $U_3$ at the output of the electronic switch 61;

FIG. 6d shows the waveform of the voltage $U_4$ at the input of the operational amplifier 54 of the integrator 53; and FIG. 6e shows the waveforms of the voltage $U_5$ at the output of the integrator 53 and the voltage $U_6$ at the output of the control signal former 2.

FIG. 7 shows graphical representations of the formation of a variable amplitude sawtooth signal at the output of the generator 9 at $\alpha > 40°$.

FIG. 7a shows the waveform of the voltage $U_7$ at the output of the control pulse generator;

FIG. 7b shows the waveform of the voltage $U_8$ at the first input of the generator 9 which modifies the amplitude of sawtoothed voltage;

FIG. 7c shows the waveform of the voltage $U_9$ at the output of the electronic switch 61;

FIG. 7d shows the waveform of the voltage $U_{10}$ at the input of the operational amplifier 54 of the integrator 53; and FIG. 7e shows the waveforms of the voltage $U_{11}$ at the output of the integrator 53 and the voltage $U_{12}$ at the output of the control signal former 2.

The phase control arrangement of the valve converter 1 functions in the following manner. A linearly increasing signal with a flat portion $U_5$ of the sawtooth signal (FIG. 6e) fed to the input 8 of the zero element 6 is produced in the sawtooth generator 9 (FIG. 1). A control pulse $U_6$ from the control signal former 2 is fed to the input 7 of the zero element 6. During the time in which the sawtooth signal $U_5$ is less than the control signal $U_6$ the zero element 6 is in, the zero state and its output signal is zero. During the increase of the flat portion of the sawtooth signal $U_5$, there is a moment $t_1$ at which this signal becomes equal to the control signal $U_6$. This results in actuation of the zero element 6 and its output signal becomes equal to unity. Actuation of the zero element 6 is the command which is fed, via the phase limiter 13, to the input 16 of the control pulse generator 15, which is built of the monostable multivibrator circuit and produces a pulse $U_1$ (FIG. 6a) of a pre-set constant duration $t_o$. This pulse is fed to the input 17 of the sawtooth generator 9 to cause the formation of the steep front portion of the sawtooth signal $U_5$ (FIG. 6c). The steep front portion is a linearly decreasing one and its duration depends on the duration $t_o$ of the pulse $U_1$. The formation of the steep decreasing front portion of the sawtooth signal $U_5$ results in actuation of the zero element 6 returning it back to the zero state. As a result, the sawtooth signal $U_5$ again becomes less than the control signal $U_6$. After the formation of the steep decreasing front portion, the sawtoothed oscillator 9 starts forming the next increasing portion (time $t_2$) and the cycle begins anew.

Pulses from the output of the generator 15 (FIG. 1) are also fed to the pulse distributor 19 to be distributed by the six outputs 26, 27, 28, 29, 30 and 31 among the valves 20, 21, 22, 23, 24 and 25 of the converter 1. The pulses are distributed in a ring sequence. If one of the pulses received at the input of the pulse distributor 19 results in the appearance of a pulse at the output 26, the next pulse will cause a pulse to appear at the output 27, and so on. After the pulse appears at the output 31 of the distributor 19, the input 26 will be the next one to be actuated. Pulses from the outputs 26, 27, 28, 29, 30 and 31 of the distributor 19 are transmitted to the respective valves 20, 21, 22, 23, 24 and 25 of the valve converter 1 to make them conductive. Parameters of the sawtooth signal $U_5$ are adjusted in such a manner that with an unchanged control signal $U_6$, its recurrence period $T_o/6$ is one sixth as long as the period $T_o$ of the voltage on the a-c. side of the converter 1. Thus the pulse period at each of the outputs 26, 27, 28, 29, 30 and 31 of the distributor 19 is exactly equal to the voltage period on the a-c. side of the converter 1, hence the phase of pulses in voltage on the a-c. side which determines the ignition angle has a certain constant value.

If the control signal $U_6$ changes, e.g. if it increases by $\Delta U_6$ (FIG. 6), the moment of equality of the pulses $U_5$ and $U_6$ is shifted by the amount $\Delta t_1 = t_5 - t_4$ relative to that moment $t_3$ which would correspond to the unchanged control signal. The new position of the moment of equality of the control signal $U_6$ and the sawtooth signal $U_5$ (moment $t_5$) corresponds to a different value of the phase of control pulses in voltage on the a-c. side and, hence, to a different ignition angle $\alpha$. Thus, with a change in the value of the control signal the phase of pulses is modified, that is phase control takes place. The ratio of the phase shift to the modification of the control signal which has caused it characterizes the efficiency of operation of the control arrangement and is referred to as conversion ratio $K_\alpha$.

Control signal $U_6$ is produced in the control pulse former 2 as the difference between a pre-set signal and a signal of a measured value of a performance parameter. For that purpose, the signal former 2 comprises an adding operational amplifier 49 (FIG. 2) having the resistor 50 in the feedback circuit and two input resistors 51 and 52. A signal from the converter 1 corresponding to the controlled value of a performance parameter, such as rectified current of the converter obtained from a current transducer incorporated in the converter 1 such as from a d-c. transformer (not shown), is fed to the resistor 52. A signal from the reference signal unit 4 is fed to the resistor 51. The value of this signal is equal to the required value of the controlled performance parameter, but has an opposite polarity. Thus a signal is obtained at the output of the operational amplifier 49 which is equal to the difference between the pre-set and actual values of the controlled performance parameter. This difference signal is used at the control signal $U_6$. If the rectified current of the converter (performance parameter) increases, this results in the signal depending on the actual value of the rectified current to exceed the pre-set value of the signal, and, hence, the output signal of the operational amplifier 49 or control signal also increases. Thus the moments of equality of the sawtooth signal and the control signal are shifted in the sawtooth operator 9 in the direction of delay, so that control pulses at the output of the control pulse generator 15 are also delayed. The shift of the control pulses in the direction of delay results in a lower rectified voltage of the converter 1 and, hence, in a lower current and in restitution of the pre-set value of rectified current.

For setting-up a required performance parameter, the control arrangement is provided with the reference signal unit 4.

In order to set-up the value, the slide 48 of the potentiometer 47 is displaced, the extreme points of the potentiometer being supplied with stabilized voltage $U_d$.

The range of the phase shift of control pulses is limited.

The control pulses should not be shifted in the direction of delay by more than the amount corresponding to the ignition angle $\alpha = 0°$, since otherwise a positive voltage required for ignition could not be maintained at the valves.

The shift of control pulses in the delay direction is limited by the disturbance of correct alternation of switching of the converter valves in the inverter mode.

For that purpose, the control arrangement has the phase limiter 13 for limiting the phase of control pulses.

A signal from the zero element 6 which represents the command for driving the control pulse generator 15 is fed to the input of the phase limiter 13 and from the output thereof to the input of the generator 15. Alternating voltages from six phases of the secondary winding of the voltage transformer 38, having its primary winding connected to the primary winding of the power transformer 45 of the converter 1, are fed to the inputs 39, 40, 41, 42, 43 and 44.

Figure 5:
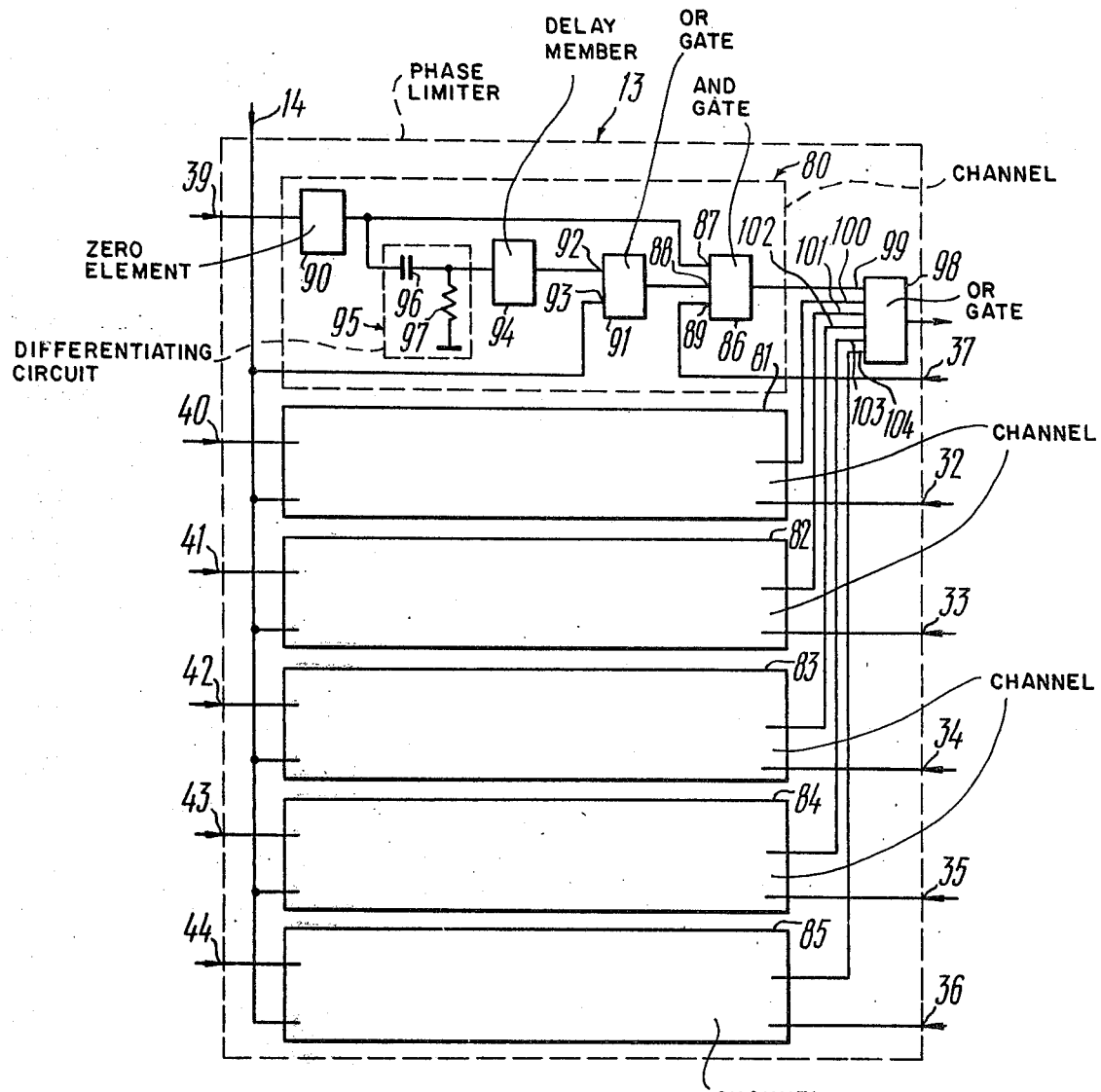
FIG. 5 is a block diagram of the phase limiter according to the invention.

The phase limiter 13 has six identical channels 80, 81, 82, 83, 84 and 85 in accordance with the number of valves of the converter 1 (FIG. 5). Voltage from the phase of the voltage transformer 38 which is connected to the input 39 of the phase limiter 13 is fed to the zero element 90 of the channel 80. The signal becomes zero at the input of the zero element at time moments, when its sinusoidal input voltage is negative, and unity, when this voltage is positive. Since voltages at the six phase secondary winding of the voltage transformer 38 coincide in phase with the line (phase-to-phase) voltages of the secondary winding of the power transformer 45, positive values of voltage at the input 39 and unity values of signal at the output of the zero element 90 correspond to a positive voltage at the valve 20 of the converter 1.

A signal at the output of the zero element 90 which becomes unity concurrently with the appearance of positive voltage at the valve 20 of the converter 1 is used as the allowing signal for transmission of the signal from the zero element 6 to drive the control pulse generator 15. For that purpose, the signal from the zero element 6 is fed to the input 93 of the OR gate 91 and then to the input 88 of the AND gate 86, and it can pass through this gate only if a signal is also fed to the input 87. Therefore, until there is a unity value at the input 87 of the AND gate (until the appearance of positive voltage at the valve 20 of the converter 1) no pulse can be fed to the valve 20. The AND gate 86 also has a third input 89 receiving a signal from the output 31 of the pulse distributor 19 via the input 37 of the phase limiter. A unity value appears at the output 31 (FIG. 2) of the pulse distributor 19 in case the foregoing pulse was fed to the preceding valve 25 from the output 31 of the distributor 19. An allowing signal at the input 89 of the AND gate 86 thus appears in case the preceding valve 25 was actuated by the foregoing pulse. This configuration provides maintainance of a ring sequence of pulse distribution.

Phase shift of the control pulses in the direction of delay cannot be too great. This would result in disturbance of the correct alternation of switching in the inverter mode. In order to limit the pulse shift, the signal from the zero element 90 passes through the differentiating circuit 95, consisting of the capacitor 96 and the resistor 97, having an output at which a short pulse is formed at the moment when the signal at the output of the zero element 90 changes from zero to unity; then, this signal is delayed in the delay member 94 and fed to the input 92 of the OR gate 91. Delay time is selected to be equal to the admissible delay value of the control pulses. If no signal arrives during the admissible delay time from the zero element 6 to the input 93 of the OR gate 91, a replacing signal from the delay member 94 is fed to the input 92 of this gate to be fed further to the input 88 of the AND gate 86.

The remaining channels 81, 82, 83, 84 and 85 are identical in configuration with the channel 80. Signals from all six channels 80, 81, 82, 83, 84 and 85 are fed to the inputs 99, 100, 101, 102, 103, 104 of the OR gate 98. Therefore, a signal appears at the output of this gate 98 which is also the output of the phase limiter 13, concurrently with the appearance of signal at the output of any of the channels 80, 81, 82, 83, 84 and 85, and the control pulse generator 15, which is common for all six valves 20, 21, 22, 23, 24 and 25, produces a control pulse following a signal from any of the channels 80, 81, 82, 83, 84 and 85.

The pulse distributor 19 functions in the following manner. Prior to the beginning of operation, one of the trigger circuits 74, 75, 76, 77, 78 and 79 (FIG. 4), e.g. the trigger circuit 74, is set when the output signal Q = 1 and output signal $\overline{Q} = 0$. The remaining trigger circuits 75, 76, 77, 78 and 79 are reset: Q = 0, $\overline{Q}$ = 1. During the time intervals in which there are no control pulses, this state of the trigger circuits is maintained since no actuation of the trigger circuits can take place in the absence of a signal at the allowing input C. With the appearance of the control pulse at the input of the pulse distributor 19, an allowing signal appears at the inputs C of all six trigger circuits. The trigger circuit 75 is thus set since a unity signal from the output Q of the trigger circuit 74 is fed to the input R of the trigger circuit 75 to set it. The trigger circuits 76, 77, 78 and 79 remain reset since a unity signal is fed from the output $\overline{Q}$ of the trigger circuits 75, 76, 77 and 78, respectively, to the inputs R to confirm their reset state. A unity signal is fed from the output $\overline{Q}$ of the trigger circuit 79 to the input R of the trigger circuit 75 to reset it. Therefore, under the action of a control pulse, the trigger circuit 75 is set and the remaining trigger circuits are reset. The next pulse will set the trigger circuit 76, then 77, and so on. The pulse distributor 19 is switched in a ring sequence.

The sawtooth oscillator 9 functions in the following manner. A signal coming to the input 10 is inverted in the inverter 62. A signal of the same waveform and with opposite polarity, as compared to the signal at the input 10, is fed to the signal input of the electronic switch 61. When the transistor 60 of the electronic switch is blocked, the signal from the output of the inverter 62 is fed, via the resistors 59, 58, to the input of the operational amplifier 54. If the transistor 60 is conductive, the junction of the resistors 59 and 58 is short-circuited to ground. Since control pulses are fed from the input 17 to the base of the transistor 60, this transistor is blocked up feeding of the pulse and conductive when there is no pulse, so that the signal $U_3$ at the collector thereof is zero (FIG. 6c) if there is no control pulse $U_1$ (FIG. 6a), and is proportional with but opposite in polarity to the signal $U_2$ (FIG. 6b) upon feeding of the control pulse. Upon a change in the signal value $U_2$ at the input 10 at the moment $t_3$, the amplitude of the pulse $U_3$ at the collector of the transistor 60 is modified accordingly.

A non-inverted signal from the input 10 of the sawtooth oscillator 9 is also fed to the input of the operational amplifier 54 via the resistor 57. The sum $U_4$ (FIG. 6d) of the signals fed from the resistors 57 and 58 constitutes the input signal of the integrator 53. The value of the resistor 57 is selected to make the d-c. component of the signal $U_4$ equal to zero. The signal $U_4$ is integrated in the operational amplifier 54 having the capacitor 55 in the feedback circuit. The signal $U_5$ at its output is the sawtooth signal which is fed to the input of the zero element 6. The resistor 56 in the feedback circuit of the operational amplifier 54 is used to prevent the output signal from overshooting to the saturation zone of the amplifier.

The control arrangement conversion ratio depends on the value of the correction signal $U_2$. FIG. 7 shows graphical representations of the formation of the sawtooth signal at the output of the generator 9 at $\Delta > 40°$. Signal $U_8$ in FIG. 7b is higher than the signal $U_2$ in FIG. 6b. Signals $U_9$ in FIG. 7c at the collector of the transistor 60, the sum $U_{10}$ (FIG. 7d) of the signals at the resistors 57 and 58, and the sawtooth signal $U_{12}$ at the output of the operational amplifier 54 are respectively higher.

It is clear from a comparison of FIGS. 6e and 7e that different values of the shift of the next control pulse $\Delta t_1 > \Delta t_2$ correspond to the same increments of the control signal $\Delta U_6$ at the moment $t_3$ and $\Delta U_{11}$ at the moment $t_6$. This means that a lower conversion ratio $K_\alpha$ corresponds to greater values of the additional (correction) signal. By increasing the value of the additional control signal the conversion ratio $K_\alpha$ may be lowered, and vice versa. The correction signal which controls the conversion ratio is fed to the input 10 of the generator 9 from the output of the functional converter 11.

The functional converter 11 is designed for producing a signal modifying the amplitude of the sawtooth signal in accordance with non-linear principles in such a manner that the gain $K_o$ for a closed loop control circuit depending on the amplitude of the sawtooth signal should be as close as possible to that admissible from the stability considerations over the entire range of variation of the ignition angle and, hence, the range of variation of the control signal.

The maximum admissible gain providing for stability is in non-linear dependence on various performance parameters: ignition angle, load current, switching angle and the like. These relationships may be obtained from known principles.

Generally, the maximum admissible gain decreases with an increase in the ignition angle and load current.

For maximum load current the stability is maintained, if the gain remains unchanged and high enough for small ignition angles and, hence, for low values of control pulse. As the ignition angle $\alpha$ becomes greater, the gain decreases and again becomes constant but is lower beginning with a certain value of the ignition angle $\alpha$.

It should be noted that the stability margin is broader with lower load currents.

Figure 3:
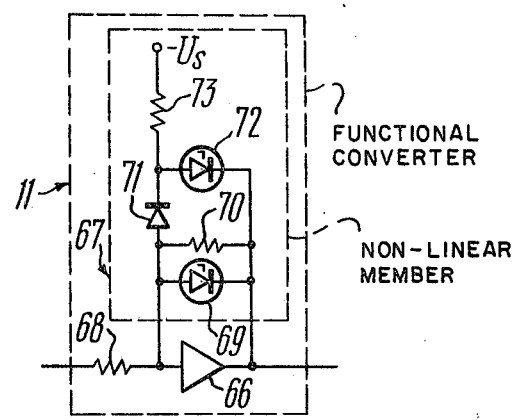
FIG. 3 is an electrical schematic of a non-linear member in a feedback circuit of the functional converter according to the invention.

The functional converter 11 comprises the operational amplifier 66 having the linear input resistor 68 and the non-linear resistor 67 in the feedback circuit (FIG. 3).

For low values of the signal at the input of the resistor 68 (from zero up to the value equal to the stabilization voltage of the Zener diode 72) an unchanged voltage is maintained at the output of the operational amplifier 66, which is equal to the stabilization voltage of the Zener diode 72 so that the diode 72 is conductive under these conditions due to the current flowing from the output of the operational amplifier 66 through the resistor 70, diode 71 and the resistor 73 to the source of bias voltage $U_s$. Thus, an unchanged voltage is maintained between the input and output of the operational amplifier 66 by means of the Zener diode 72 which is equal to the stabilization voltage of the Zener diode 72 and which does not depend on the signal at the resistor 68. This implies that the voltage is also constant at the output of the functional converter 11, and this voltage is equal to the stabilization voltage of the Zener diode 72.

With signal values at the input of the resistor 68 which are greater than the stabilization voltage of the Zener diode 72 and lower than the stabilization voltage of the Zener diode 69, the diode 71 is blocked, and only the resistor 70 remains in the feedback circuit. This corresponds to the proportionality between the output and input signals. Therefore, as the input signal grows from the value equal to the stabilization voltage of the Zener diode 72 to the stabilization voltage of the Zener diode 69, the output voltage increases with the input signal.

After the input has achieved the stabilization voltage of the Zener diode 69, further growth of the output signal is stopped due to the fact that the now conductive Zener diode 69 shunts the resistor 70 thus blocking-off further increase in the output signal.

The values of the stabilization voltage of the Zener diodes 72 and 69 and the value of the resistor 70 are selected in such a manner that the output signal of the amplifier 66 remains unchanged up to the values of the input signal at the resistor 68, which corresponds to the ignition angle $\alpha = 15°$ of the converter, and then increases to the value corresponding to the ignition angle $\alpha = 40°$ and further remains constant.

A lower amplitude of the sawtooth signal and hence, a higher conversion ratio, corresponds to lower values of the signal fed from the output of the operational amplifier 66 to the input 10 of the sawtooth generator 9. Therefore, with a growth of the control signal from zero up to the maximum value the conversion ratio first remains unchanged and greater (up to an ignition angle $\alpha = 15°$), then decreases (beginning with and ignition angle $\alpha = = 15°$ up to an ignition angle $\alpha = 40°$), and further remains unchanged but lower (beginning with an ignition angle $\alpha = 40°$).

What is claimed is:

1. A phase control arrangement of a valve converter comprising: a reference signal unit having an output; a control pulse former having a first input connected to said output of said reference signal unit, a second input electrically coupled to the valve converter and an output; a sawtooth generator having a first input connected to said output of said control signal former, a second input designed for transmitting a signal modifying the amplitude of the sawtooth signal, and an output; a zero element having a first input connected to said output of said control signal former, a second input connected to said output of said sawtooth generator and an output; a phase limiter having an input connected to said output of the zero element and an output; a control pulse generator having an input connected to said output of said phase limiter and an output connected to said second input of said sawtooth generator; a pulse distributor for distributing pulses among valves of the valve converter having an input connected to said output of said control pulse generator and outputs connected to respective valves, the number of outputs corresponding to the number of valves of said valve converter.

2. A phase control arrangement of a valve converter according to claim 1, further comprising: a functional converter, for non-linear conversion of the signal modifying the amplitude of the sawtooth signal, having an input connected to said output of said control signal former and an output connected to said first input of said sawtooth generator.

3. A phase control arrangement of a valve converter according to claim 1, wherein said sawtooth generator includes an integrator having a first input connected to said first input of said sawtooth generator, a second input and an output connected to said output of said sawtooth generator, an electronic switch having a control input connected to said output of said control pulse generator and to said second input of said sawtooth generator, a signal input and an output connected to said second input of said integrator, and an inverter connected in series with said electronic switch and having an input connected to said first input of said sawtooth generator and an output connected to said signal input of said electronic switch.

4. A phase control arrangement of a valve converter according to claim 3, further comprising: a functional converter, for non-linear conversion of the signal modifying the amplitude of the sawtooth signal, having an input connected to said output of said control signal former and an output connected to said first input of said sawtooth generator.

* * * * *